United States Patent
Scotto D'Anielo (10) Patent No.: US 6,941,894 B2
(45) Date of Patent: Sep. 13, 2005

(54) LITTER BOX MADE OF SEVERAL PERFORATED PANS FOR CATS OR OTHER DOMESTIC ANIMALS

(76) Inventor: René Scotto D'Anielo, 1650 rue Principale, Saint-Blaise, Quebec (CA) J0J 1W0

( * ) Notice: Subject to any disclaimer, the term of this patent is extended or adjusted under 35 U.S.C. 154(b) by 0 days.

(21) Appl. No.: 10/849,255

(22) Filed: May 20, 2004

(65) Prior Publication Data

US 2005/0115510 A1 Jun. 2, 2005

(30) Foreign Application Priority Data

Nov. 6, 2003 (CA) .................................. 2448830

(51) Int. Cl.[7] .............................................. A01K 1/01
(52) U.S. Cl. ..................................................... 119/166
(58) Field of Search ........................ 119/166, 165, 167, 119/168; 220/23.83, 23.86, 23.87, 23.88, 220/23.89

(56) References Cited

U.S. PATENT DOCUMENTS

| | | | | |
|---|---|---|---|---|
| 1,027,734 A | * | 5/1912 | Hunnicut | .................... 209/355 |
| 2,963,003 A | * | 12/1960 | Oberg et al. | ................ 119/166 |
| 3,752,120 A | * | 8/1973 | Pallesi | ......................... 119/166 |
| 3,809,013 A | * | 5/1974 | Rigney et al. | ............... 119/167 |
| 4,217,857 A | | 8/1980 | Geddie | |
| 4,312,295 A | * | 1/1982 | Harrington | .................. 119/167 |
| 4,716,853 A | | 1/1988 | d'Anielo | |
| 4,813,376 A | * | 3/1989 | Kaufman et al. | ........... 119/168 |
| 5,325,815 A | * | 7/1994 | Gumpesberger | ............ 119/166 |
| 5,517,947 A | * | 5/1996 | Christman | ................... 119/166 |
| 5,701,844 A | * | 12/1997 | Murphy | ...................... 119/166 |
| 5,782,374 A | * | 7/1998 | Walker | ..................... 220/23.87 |
| 5,797,346 A | * | 8/1998 | Lewis | ......................... 119/166 |
| 6,295,948 B1 | * | 10/2001 | Bowron | ...................... 119/165 |
| 6,484,374 B2 | * | 11/2002 | McAllister | ................... 24/557 |
| 6,668,755 B1 | * | 12/2003 | Koster | ........................ 119/167 |

* cited by examiner

Primary Examiner—Yvonne R. Abbott
(74) Attorney, Agent, or Firm—Robic (57) ABSTRACT

A litter box for cats or other domestic animals, which comprises three pans insertable into each other to form a stack. The position of the pans is interchangeable and each pan has openings in its inferior part for filtration of an absorbing material used to solidify and absorb the organic wastes. The openings of each pan are located at positions different from the openings of the other pans in such a manner that the openings of each pair of adjacent pans be vertically out of line. One advantage of this litter box is that it is not necessary to use a shovel to pick up and dispose of the organic wastes.

8 Claims, 8 Drawing Sheets

LITTER BOX MADE OF SEVERAL PERFORATED PANS FOR CATS OR OTHER DOMESTIC ANIMALS

FIELD OF THE INVENTION

The present invention relates to a multilevel litter made of several perforated pans for temporary storage of organic wastes of domestic animals.

BACKGROUND

Litter boxes for cats or other domestic animals are well known in the art. A wide choice of litter boxes is also offered to consumers as alternatives to the conventional litter box, which normally consists of a simple pan filled with absorbent material. One of the objectives of these alternative litter boxes is to make them reusable in order to lower the costs associated with the replacement of the same.

Recently, new litter boxes have become available, which litter boxes are devised to considerably facilitate the task of the consumers when it is time to get rid of the organic wastes out of it.

For example, U.S. Pat. No. 4,217,857 (Geddie) discloses a litter box for domestic animals. This litter box has three pans insertable into each other as to form a stack. The stack comprises an inferior pan, an intermediate pan, as well as a superior pan. The inferior and intermediate pans are interchangeable. The superior pan has a multitude of small openings so that, when the superior pan is removed from the stack, only the absorbing material flows through these small openings, while the organic wastes solidified and absorbed by the absorbing material remain trapped into the superior pan. The consumer only has to empty the content of the superior pan into a garbage can. To reuse the litter box, the consumer must remove the intermediate pan containing the absorbing material, now emptied from any organic wastes, from the inferior pan. Then, he must insert the superior pan into the inferior pan and decant the content of the intermediate pan into the superior pan. Once the intermediate pan is empty, it is placed at the bottom of the stack. One problem with this litter box is that the consumer has to decant the absorbing material from one pan to another in a precise order. Moreover, as it was mentioned previously, only the inferior and intermediate pans are interchangeable, since these are the only pans which are identical.

Another example of a litter box for cats or other domestic animals is proposed in U.S. Pat. No. 4,716,853 in the name of the Applicant (Scotto D'Aniello). As compared to the litter box of GEDDIE, the litter box of SCOTTO D'ANIELLO is a multi-functional disposable litter box. In addition to a pan comprising a row of absorbent material, it also comprises a cover that can be mounted onto the top of the pan. The cover comprises various bowls that may be filled up with water and/or food. This litter box is an example of "all-in-one" litter box that can be found on the market. However, this structure does not make it easy to clean.

SUMMARY OF THE INVENTION

A first object of the present invention is to overcome the previously mentioned drawbacks.

More precisely, the first object of the invention is to provide a reusable litter box that can be easily and efficiently cleaned of organic wastes.

Another object of the present invention is to provide a litter box of a "ready-to-use" type, which comprises an absorbing material in it.

In accordance with the invention, these objects are achieved with a litter box for cats or other domestic animals comprising a least three pans insertable into each other to form a stack. The pans are interchangeable within the stack. Moreover, each pan comprises a floor and a peripheral wall forming together an open container capable of receiving a layer of an absorbent material for absorbing and solidifying organic wastes. The litter box also comprises a plurality of openings made within the floor of each pan. The openings of each pan are located at positions different from the openings of the other pans in such a manner that the openings of each pair of adjacent pans be vertically out of line. Each opening is sized to retain the organic wastes while allowing the absorbing material to pass therethrough.

An advantage of this litter box is that it is not necessary to use a shovel to pick up and dispose of the organic wastes.

Another advantage of this litter box is that it is not necessary to transfer the absorbing material from one pan to another after filtration, like in the case of the litter box disclosed by GEDDIE.

The invention and its advantages will be better understood in view of the following description of two preferred embodiments of the invention, these embodiments being given as non limitative examples and their description being made with reference to the accompanying drawings.

BRIEF DESCRIPTION OF THE DRAWINGS

FIGS. 6a, b and c are partial top views of the pans of a litter box according to a second preferred embodiment of the invention.

DETAILED DESCRIPTION OF PREFERRED EMBODIMENTS OF THE INVENTION

As illustrated in the accompanying drawings, the litter box according to the present invention comprises three pans 2 sized to be easily insertable into each other. Each pan has a floor 4 and a peripheral wall 6. The floor 4 and the peripheral wall 6 form together an open container 8 capable of receiving a layer of an absorbing material 22 for absorbing and solidifying organic wastes. The pans are advantageously molded in plastic to reduce the weight of the litter box. However, other materials could be used as alternatives.

Preferably, each pan 2 has an upper rim 10 opposite to the floor 4 to prevent infiltration of the absorbing material 22 between the peripheral wall 6 when the pans 2 are inserted into each other. These rims 10 also facilitate the transportation of the litter box by means of grippers 12 introduced into the rims 10 for holding together the rims 10 of all the pans 2. Other means could however be used, such as pliers (not illustrated) exercising a pressure onto the peripheral wall 6 so that the pans 2 cannot be released from each other easily. An adhesive tape located all around the rim 10 could also be used as attaching means. The adhesive tape holds together the rims 10 of the pans 2.

Advantageously, the pans 2 have vertical grooves 14 for facilitating their introduction into each other. A predetermined configuration of these grooves 14 ensures a proper orientation of the pans 2 into each other.

Advantageously also, each of the pans 2 has an handle 16 projecting outwardly from a portion of its peripheral wall 6 in order to facilitate handling of the pan 2 by a user. These handles 16 of the pans 2 are devised to be aligned when the pans 2 are inserted into each other in proper position. The handles 16 are then acting as positioning indicators.

Figure 1:
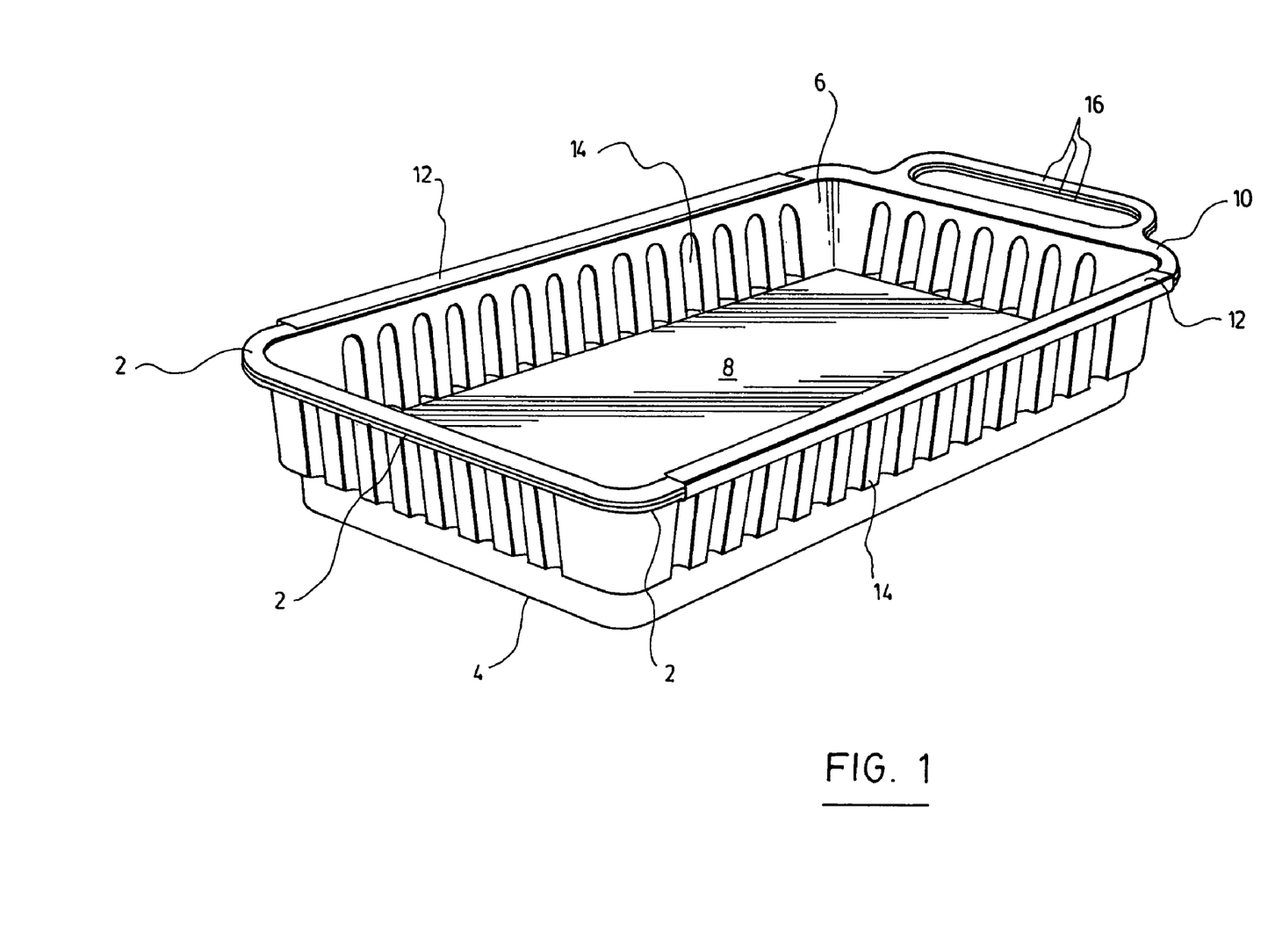
FIG. 1 is a perspective view of a litter box according to a first preferred embodiment of the invention.
Figure 2:
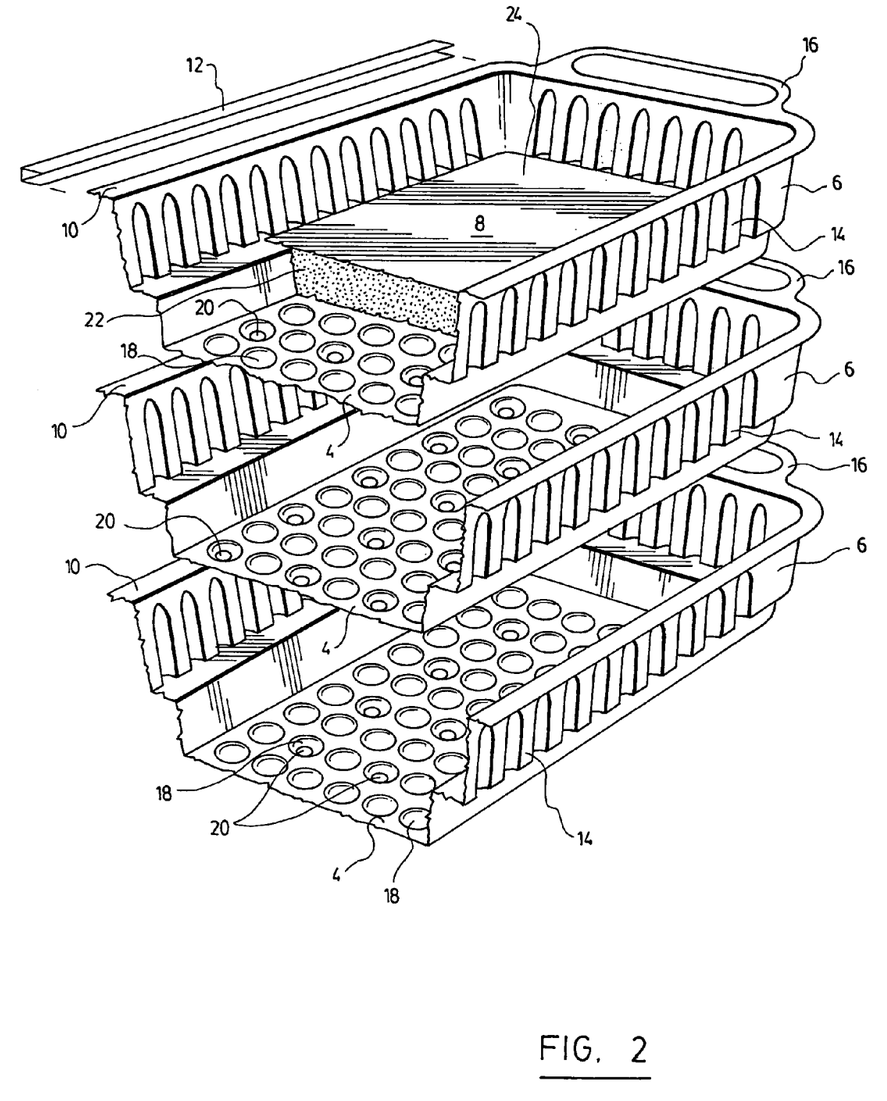
FIG. 2 is an exploded perspective view from a section of the litter box of FIG. 1.
Figure 4:
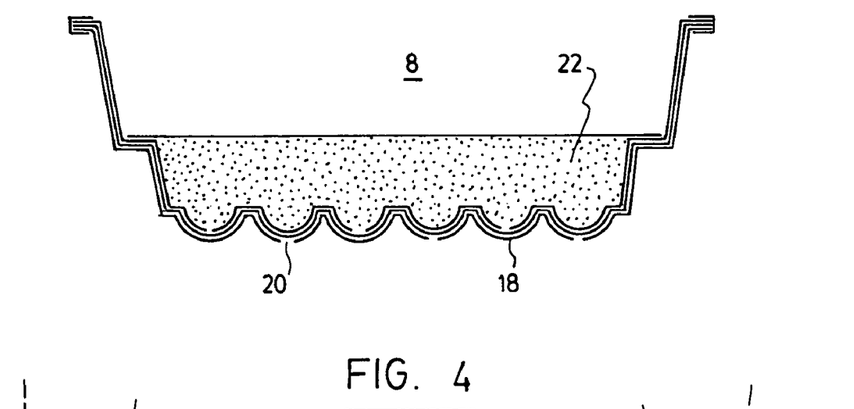
FIG. 4 is a transversal cross-section view of the litter box shown in the previous figures.

As illustrated in FIGS. 2 and 4, the absorbing material 22 is located within the open top container 8.

Figure 3A:
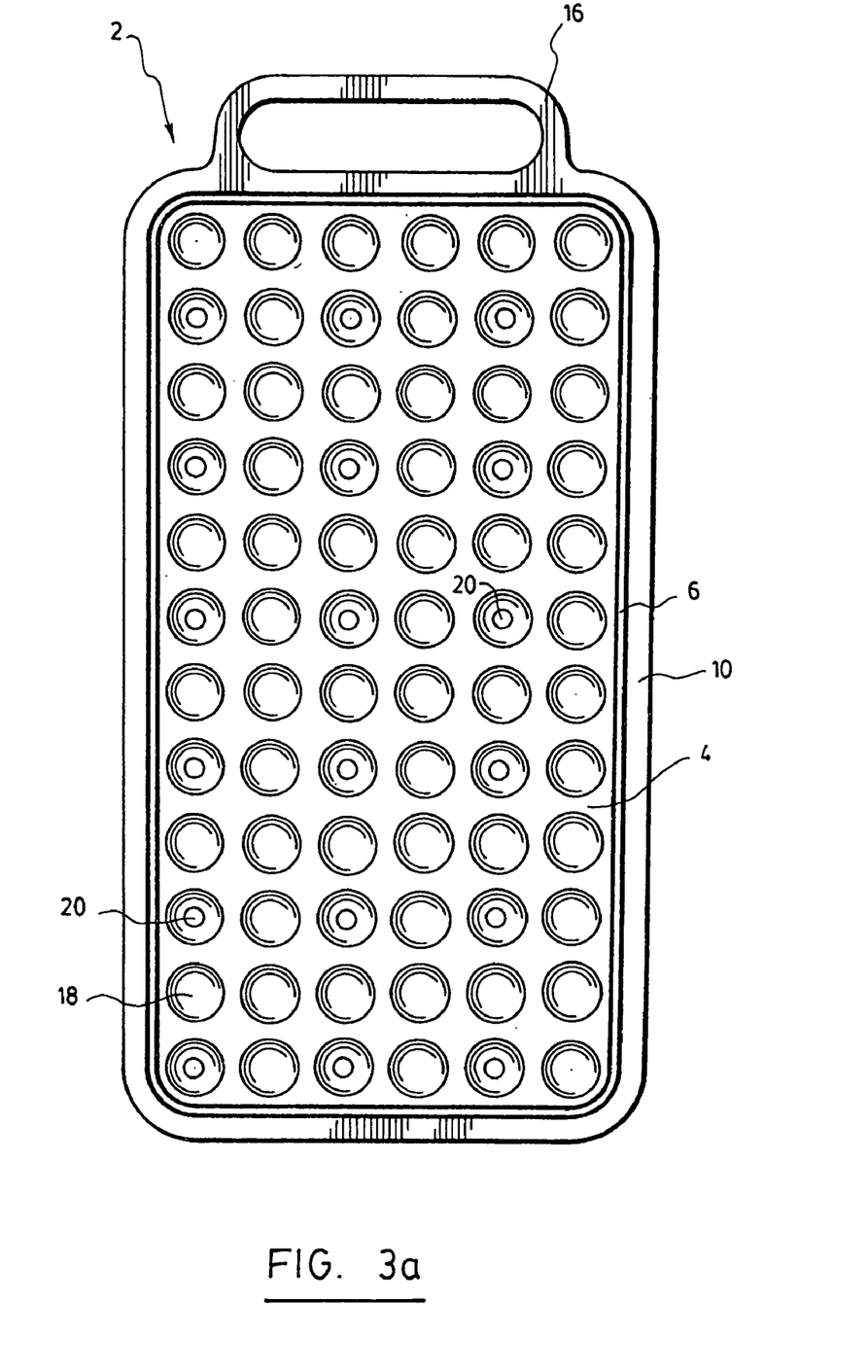
FIGS. 3a, b and c are top views of the pans of the litter box shown in FIGS. 1 and 2, showing the openings located at different positions within the pans.
Figure 3B:
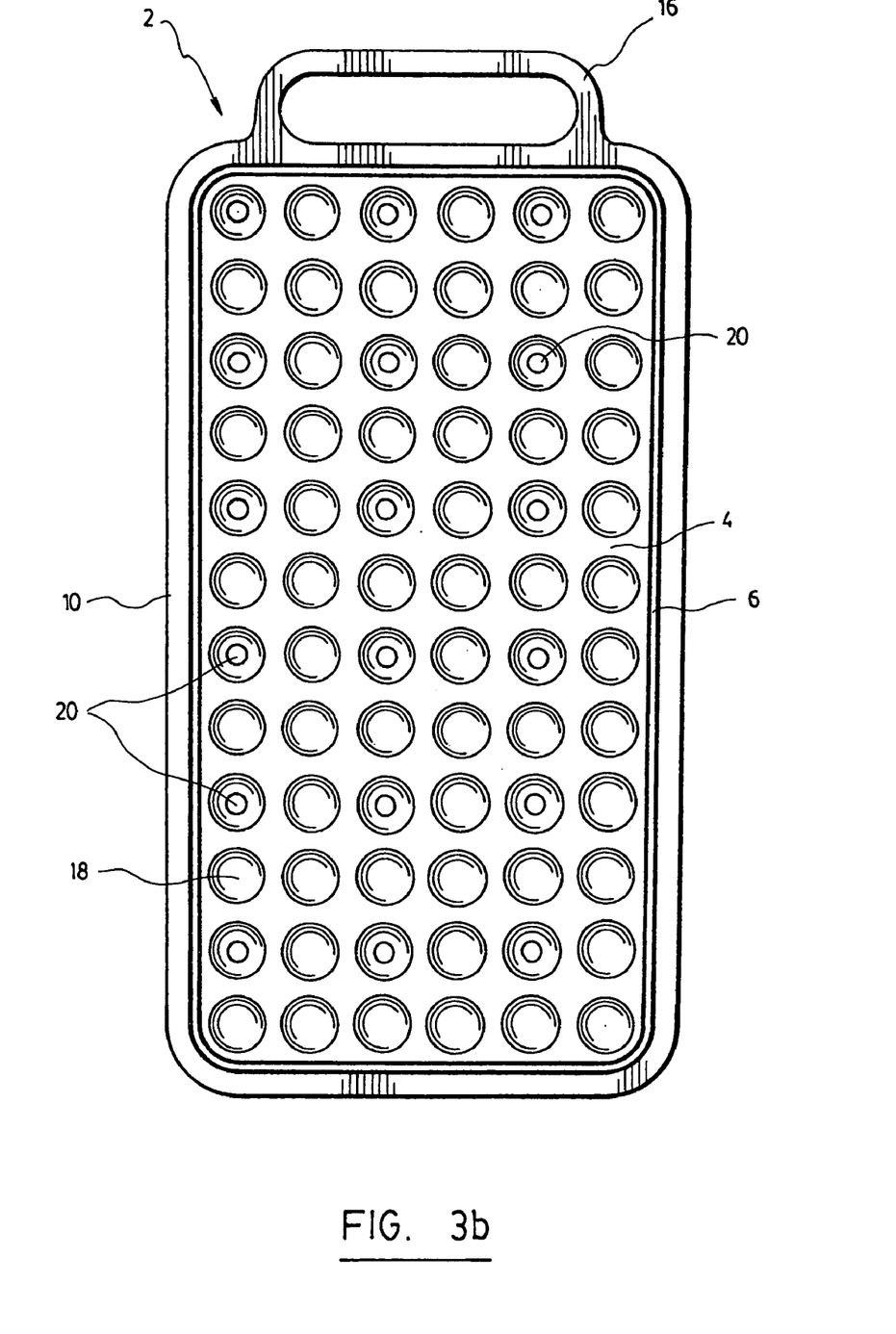
Figure 3C:
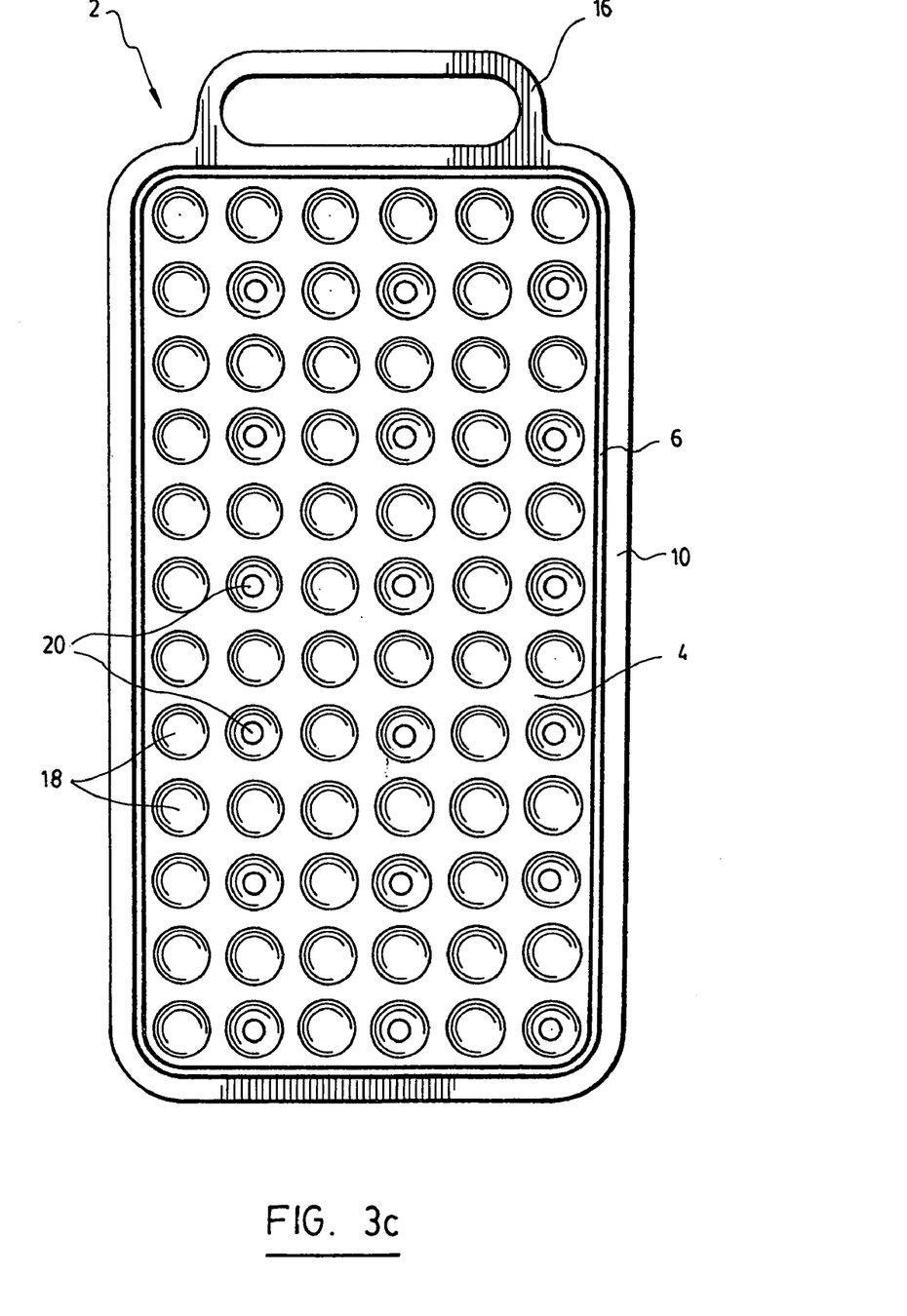

Each pan 2 has a plurality of openings 20 made within its floor 4. The openings 20 of each pan 2 are located at positions different from the openings 20 of the other pans 2 so that the openings 20 of each pair of adjacent pans 2 are vertically out of line. An example of the position of the openings 20 is shown in FIGS. 3a, to 3c. The openings 20 are sized to retain the organic wastes while allowing the absorbing material 22 to pass therethrough.

In the first preferred embodiment illustrated in FIGS. 1 to 5, cavities 18 are made in the floor 4 of each pan 2. The cavities 18 of each pan are aligned vertically with the cavities 18 made in the other pans when they are inserted into each other. The above mentioned openings 20 are located in the bottom of some of these cavities 18. These cavities 18 prevent the absorbing material 22 from getting in the openings 20 of the adjacent inferior pan 2. For the purpose of simplicity, each pan 2 shown on FIGS. 1 to 5 has being illustrated with twelve (12) rows of six (6) cavities 18. In practice, the pans 2 having a standard size will have more cavities 18. Thus, for example, the pans 2 could each have twenty-four (24) to twenty-eight (28) rows of a dozen cavities 18.

Figure 5:
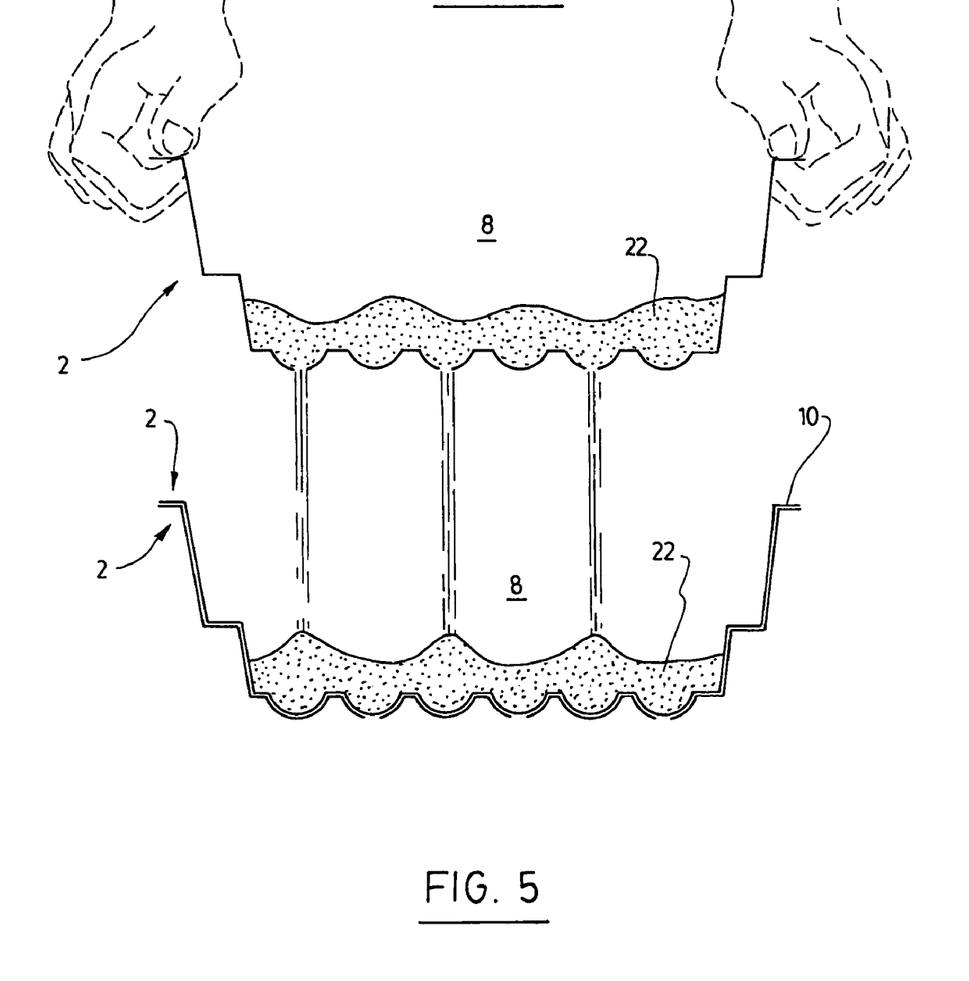
FIG. 5 is a view similar to the one of FIG. 4, illustrating how the litter box can be used.
Figures 6A, 6B:
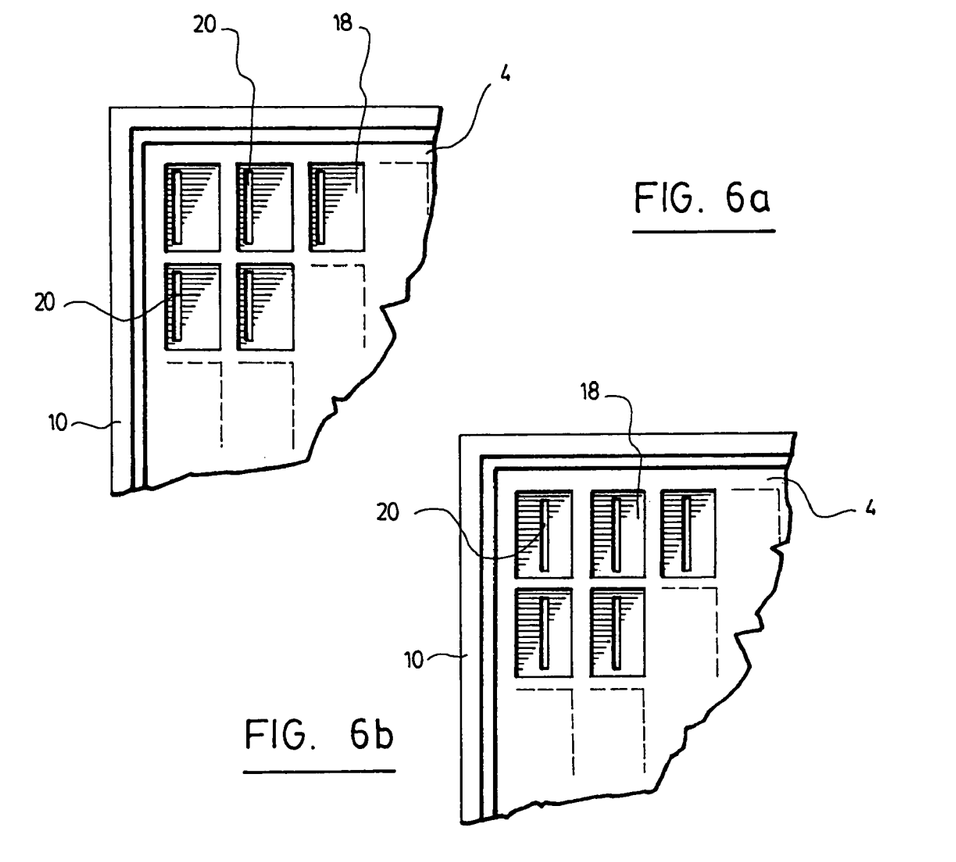
Figure 6C:
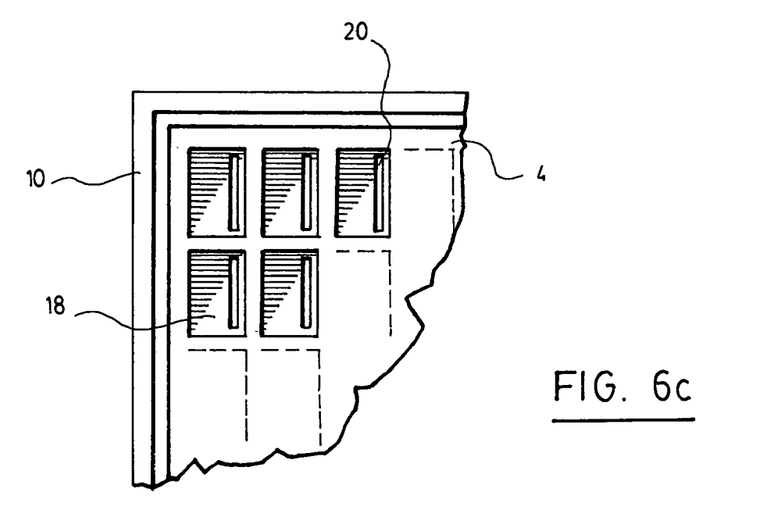
Figure 7:
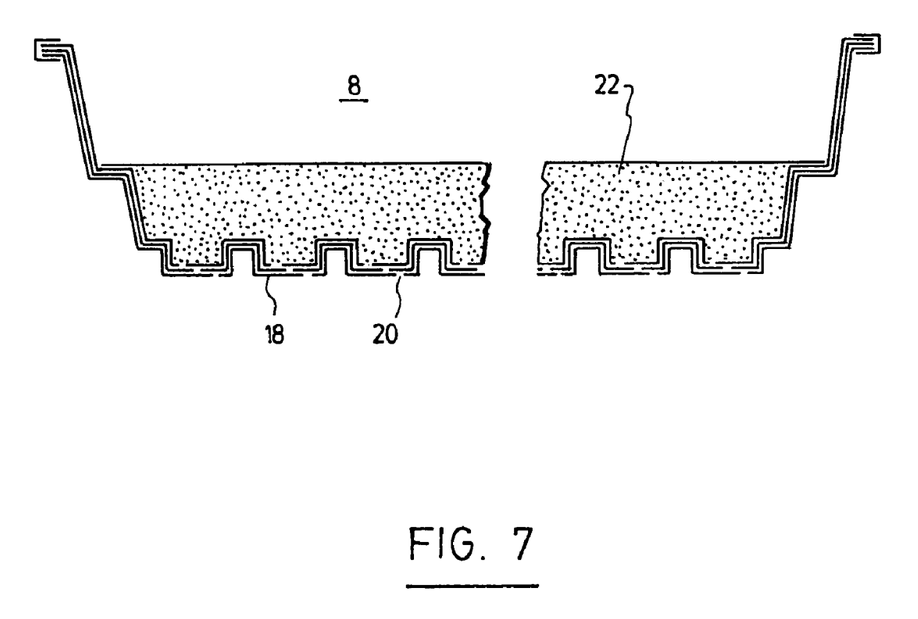
FIG. 7 is a broken transversal cross-section view of the litter box made of the pans shown in FIGS. 6a, b and c.

FIG. 5 illustrates one way of using this litter box. When organic wastes are solidified and absorbed by the absorbing material 22, the user can remove the upper pan 2 of the stack. This pan 2 contains the absorbing material 22. The user then shakes gently the pan 2 on top of the other pan 2 so that only the absorbing material 22, free of wastes, is filtrated by the openings 20. Therefore, the absorbing material 22 fills the next inferior open container 8. After all the absorbing material 22, free of wastes, has been filtrated, the organic wastes can be thrown in a garbage can. To reuse the litter box, the same pan 2 has to be placed at the bottom of the stack. Since the openings 20 of one pan 2 are not vertically aligned with those of the others, there is no risk of absorbing material 22 leaking outside the litter box.

According to the second preferred embodiment of the invention illustrated in FIGS. 6a, 6b, 6c, and 7, the openings 20 are located within the cavities 18 to facilitate the outflow of the absorbing material 22. These openings 20 are in the shape of slim rectangular slots that are located in such a manner that the openings 20 of each pair of adjacent pans 2 be out of line vertically. Only the absorbing material 22 can get through these openings 20. The cavities 18 are preferably of rectangular shape and have a width of ¾ and a length of 1". For example, the pan 2 may have a dozen cavities 18 by row and between twenty-four (24) to twenty-eight (28) rows. The openings 20 of a same pan 2 are all located at the same position within their cavities 18, while being all located at different positions from the openings 20 of the cavities 18 of the two other pans 2. Such eliminates the risk of leakage of the absorbing material 22 between two adjacent pans 2 when the same are inserted into each other. Leakage of the absorbing material 22 outside of the litter box is thus prevented.

The litter box of the present invention can be sold with or without the absorbing material 22. In the latter case, the user will have to buy the absorbing material 22. However, if the absorbing material 22 is included with the litter box when the user buys it, the absorbing material can be located within the upper container 8 which is then covered with a film 24 (see FIGS. 1 and 2) to prevent damage while transporting the litter box.

Of course, it should be evident to those skilled in the art that numerous changes and modifications can be made to the preferred embodiments of the invention disclosed hereinabove and illustrated in the accompanying drawings without departing from the essence of this invention.

I claim:

1. A litter box for cats or other domestic animals, comprising:
    at least three pans insertable into each other to form a stack, the pans being interchangeable within the stack, each pan comprising a floor and a peripheral wall forming together an open container capable of receiving a layer of an absorbing material for absorbing and solidifying organic wastes, the floor of each pan comprising cavities that are aligned vertically with the cavities made in the other pans when the same are inserted into each other; and
    a plurality of openings made within the floor of each pan, the openings of each pan being located at positions different from the openings of the other pans in such a manner that the openings of each pair of adjacent pans be vertically out of line, each opening being sized to retain the organic wastes while allowing the absorbing material to pass therethrough.

2. The litter box according to claim 1, wherein the openings are made exclusively in the bottoms of some of the cavities.

3. The litter box according to claim 1, wherein the openings are made in all the cavities, said openings being the shape of slim rectangular slots that are located in such a manner that the openings of each pair of adjacent pans be out of line vertically.

4. A litter box for cats or other domestic animals, comprising:
    at least three pans insertable into each other to form a stack, the pans being interchangeable within the stack, each pan comprising a floor and a peripheral wall forming together an open container capable of receiving a layer of an absorbing material for absorbing and solidifying organic wastes, the peripheral wall of each container comprising an upper rim opposite to the floor, the floor of each pan comprising cavities that are aligned vertically with the cavities made in the other pans when the same are inserted into each other, each pan comprising a handle projecting outwardly from a portion of its peripheral wall;
    a plurality of openings made within the floor of each pan, the openings of each pan being located at positions different from the openings of the other pans in such a manner that the openings of each pair of adjacent pans be vertically out of line, each opening being sized to retain the organic wastes while allowing the absorbing material to pass therethrough, said handles being positioned in such a manner as to be aligned when the pans are inserted into each other and the openings of each pair of adjacent pans are vertically out of line, said handles then acting as positioning indicators; and attaching means for holding together the rims of all the pans.

5. The litter box according to claim 4, wherein the openings are made exclusively in the bottoms of some of the cavities.

6. The litter box according to claim 5, wherein each pan is made of molded plastic material.

7. The litter box according to claim 4, wherein the openings are made in all the cavities, said openings being the shape of slim rectangular slots that are located in such a manner that the openings of each pair of adjacent pans be out of line vertically.

8. The litter box according to claim 7, wherein each pan is made of molded plastic material.

* * * * *